US006947645B2

(12) United States Patent
Korenaga et al.

(10) Patent No.: US 6,947,645 B2
(45) Date of Patent: Sep. 20, 2005

(54) OPTICAL PACKAGE SUBSTRATE AND OPTICAL DEVICE

(75) Inventors: Tsuguhiro Korenaga, Katano (JP); Nobuki Itoh, Kitakatsuragi-gun (JP); Masaaki Tojo, Kitakatsuragi-gun (JP); Toshihiko Wada, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 320 days.

(21) Appl. No.: 10/308,091

(22) Filed: Dec. 3, 2002

(65) Prior Publication Data

US 2003/0118288 A1 Jun. 26, 2003

(30) Foreign Application Priority Data

Dec. 4, 2001 (JP) ....................................... 2001-370151

(51) Int. Cl.[7] .............................. G02B 6/30; G02B 6/26
(52) U.S. Cl. .............................. 385/49; 385/47; 385/48
(58) Field of Search ........................ 385/14, 15, 31–33, 385/36, 37, 39, 47–52, 88, 89

(56) References Cited

U.S. PATENT DOCUMENTS

| | | | | | |
|---|---|---|---|---|---|
| 4,900,118 | A | * | 2/1990 | Yanagawa et al. | 385/24 |
| 5,357,103 | A | * | 10/1994 | Sasaki | 250/227.24 |
| 5,627,931 | A | * | 5/1997 | Ackley et al. | 385/88 |
| 5,774,609 | A | * | 6/1998 | Bäcklin et al. | 385/49 |
| 6,115,521 | A | | 9/2000 | Tran et al. | 385/52 |
| 6,132,107 | A | * | 10/2000 | Morikawa | 385/89 |
| 6,257,772 | B1 | * | 7/2001 | Nakanishi et al. | 385/89 |
| 6,704,479 | B2 | * | 3/2004 | Koplow | 385/31 |

FOREIGN PATENT DOCUMENTS

| | | | |
|---|---|---|---|
| JP | 7-198976 | 8/1995 | G02B/6/122 |
| JP | 11-326662 | 11/1999 | G02B/6/122 |
| JP | 2001-54808 | 2/2001 | B23B/35/00 |

OTHER PUBLICATIONS

Three Dimensional Processing by Micro Electro–Discharge Machining / Takeo Sato, Journal of JSPE (The Japan Society for Precision Engineering vol. 61, No. 10, 1995, pp. 1369–1372, in Japanese.

Three Dimensional Micromachining with Precision on the Order of Submicrons—Ultra–Micro Discharge Machine—Optical Alliance, Mar., 1995, pp. 28–31, in Japanese.

* cited by examiner

*Primary Examiner*—John D. Lee
(74) *Attorney, Agent, or Firm*—Wenderoth, Lind & Ponack, L.L.P.

(57) ABSTRACT

An optical package substrate and a molding method therefor which provide for easy production, easy mounting of optical elements such as photodiodes and lasers, good functionality, productivity and economy, and an optical device incorporating the package substrate. On the surface of an optical package substrate, a guide groove used for the positioning of an optical fiber and a tapered face adjoining the guide groove are provided, the tapered face being formed to have a predetermined angle. A mirror for reflecting light is formed on the tapered face. An optical fiber is affixed in the guide groove. A surface reception type photodiode, which is placed in a position for receiving light deflected by the mirror, is mounted above the tapered face. By providing a positioning marker for a light receiving element on the optical package substrate, it becomes particularly easy to mount the surface reception type photodiode through passive alignment.

18 Claims, 13 Drawing Sheets

F I G. 3
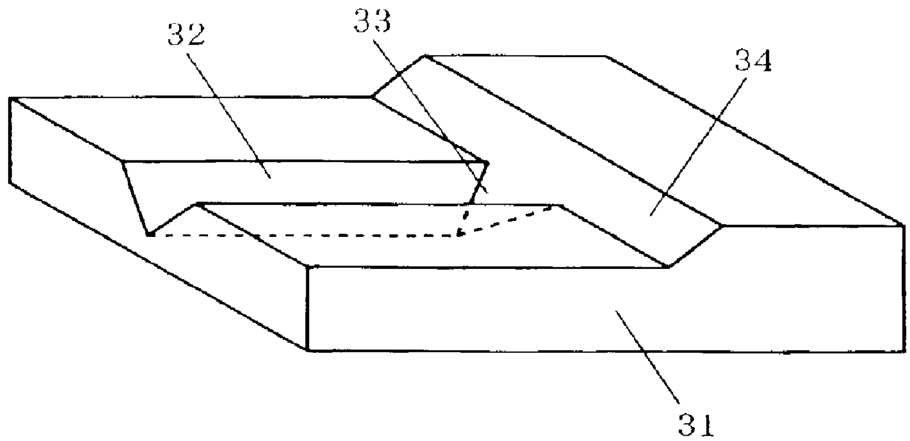
F I G. 4
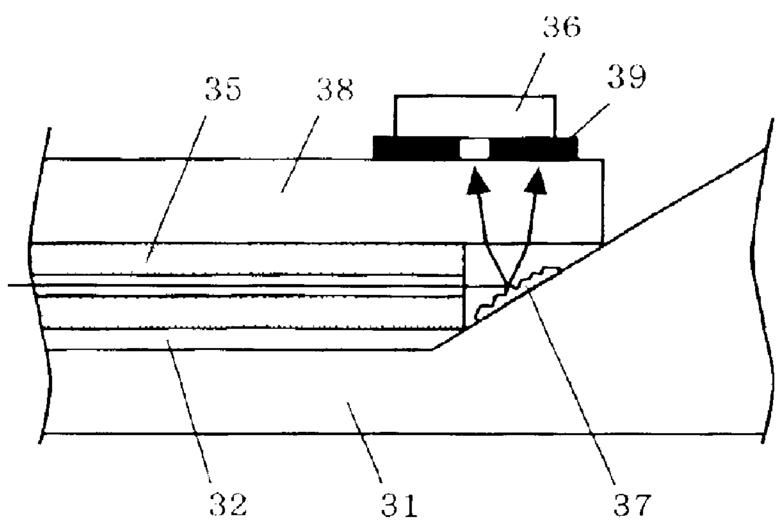

F I G. 5
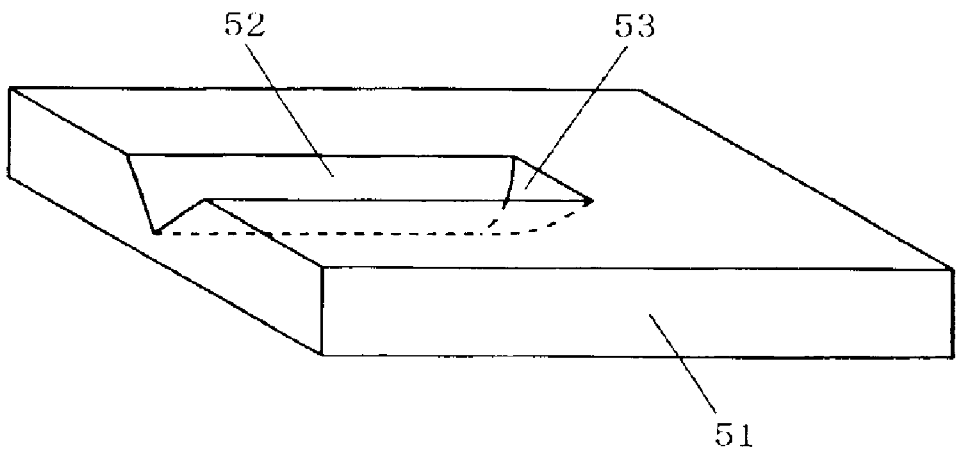
F I G. 6
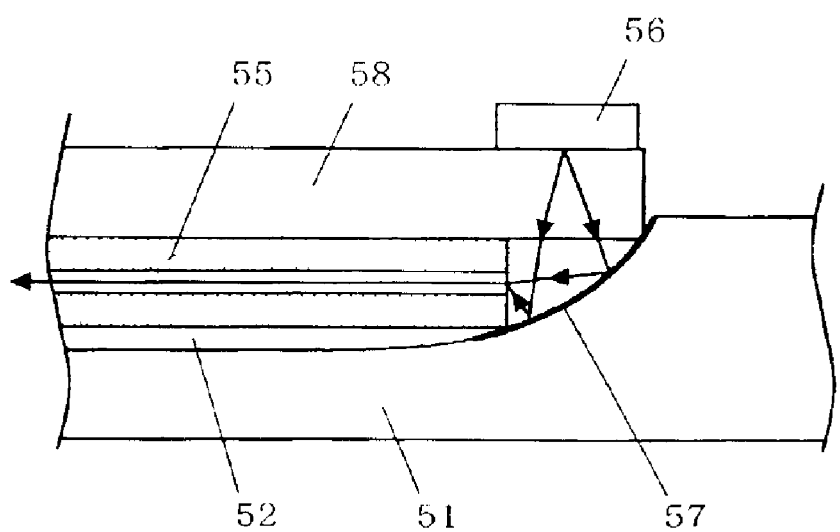

F I G. 7
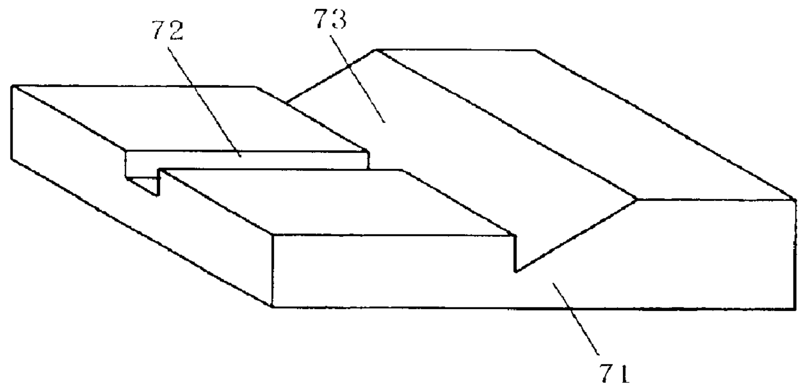
F I G. 8
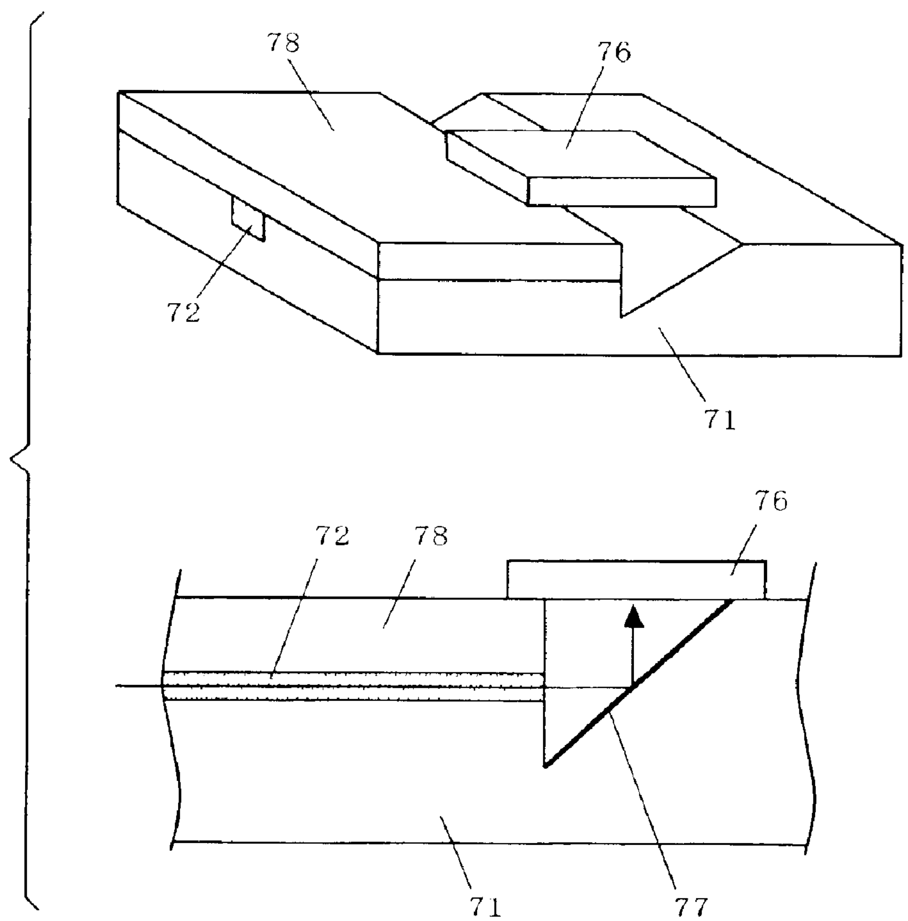

F I G. 9A
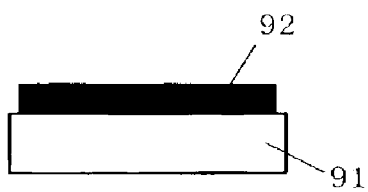
F I G. 9B
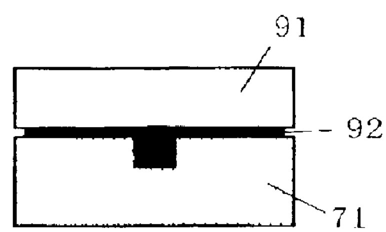

F I G. 1 2
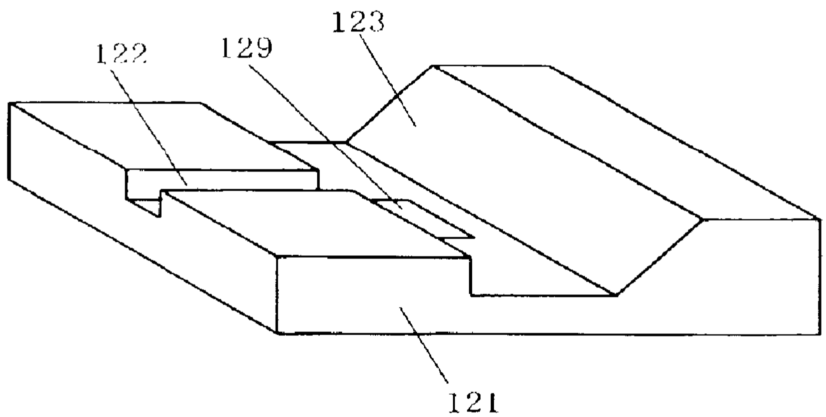
F I G. 1 3
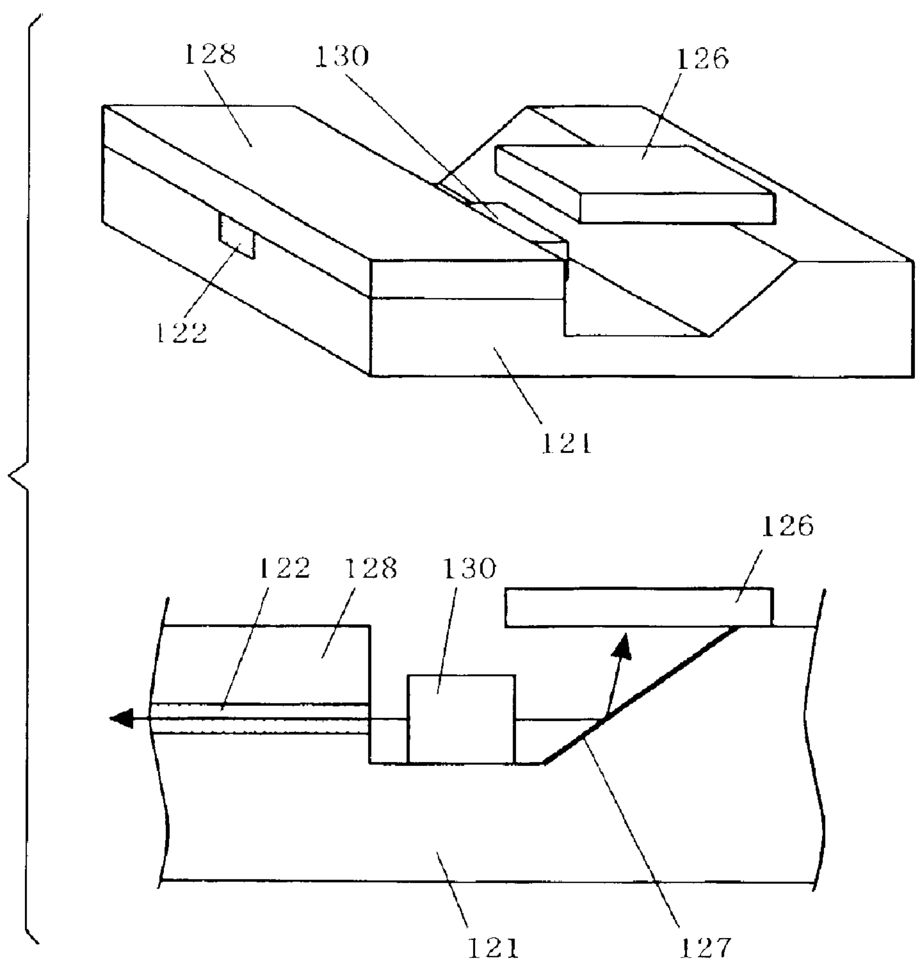

F I G. 1 4
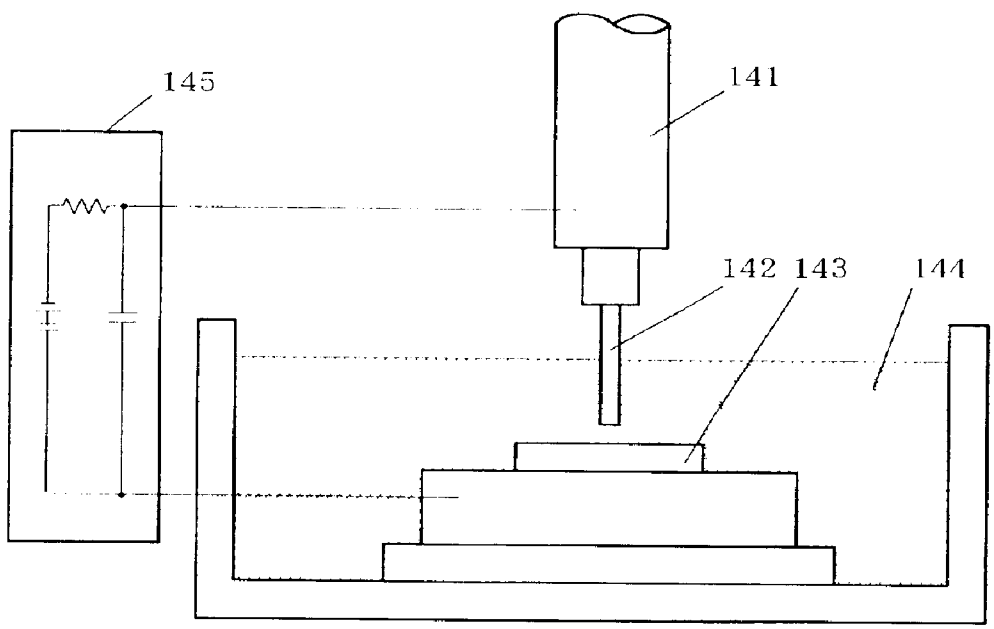

F I G. 1 5
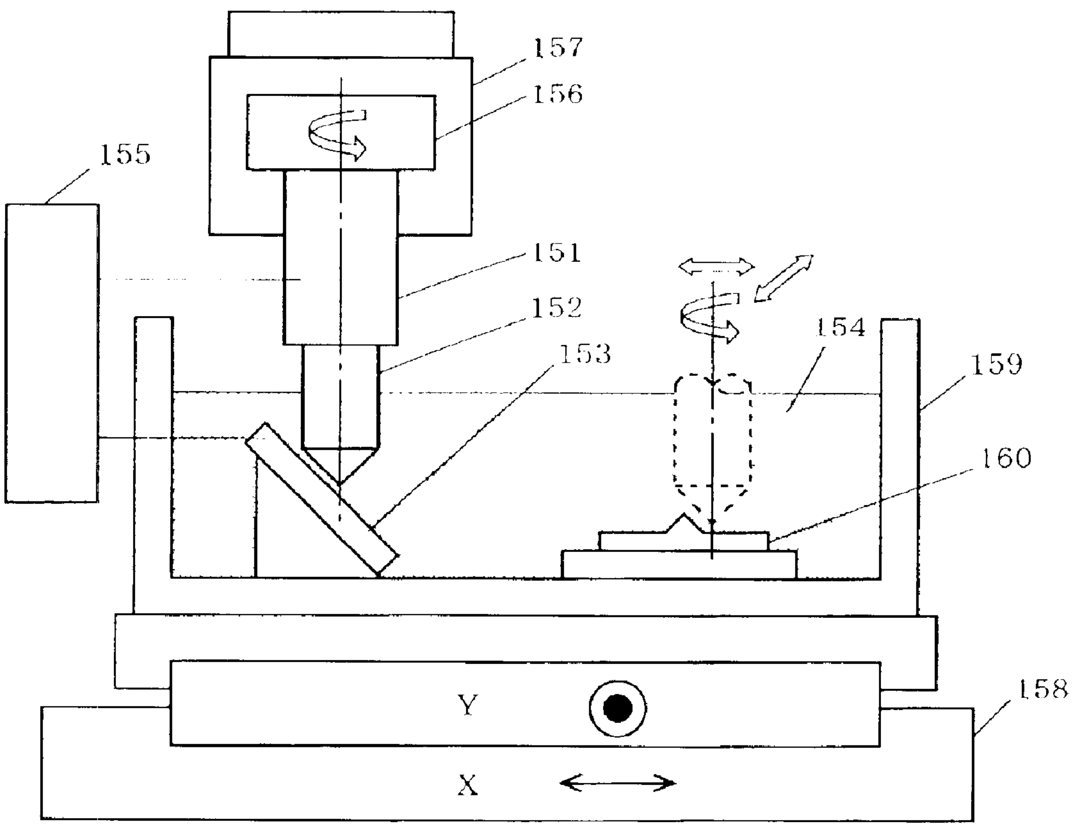

F I G. 1 6
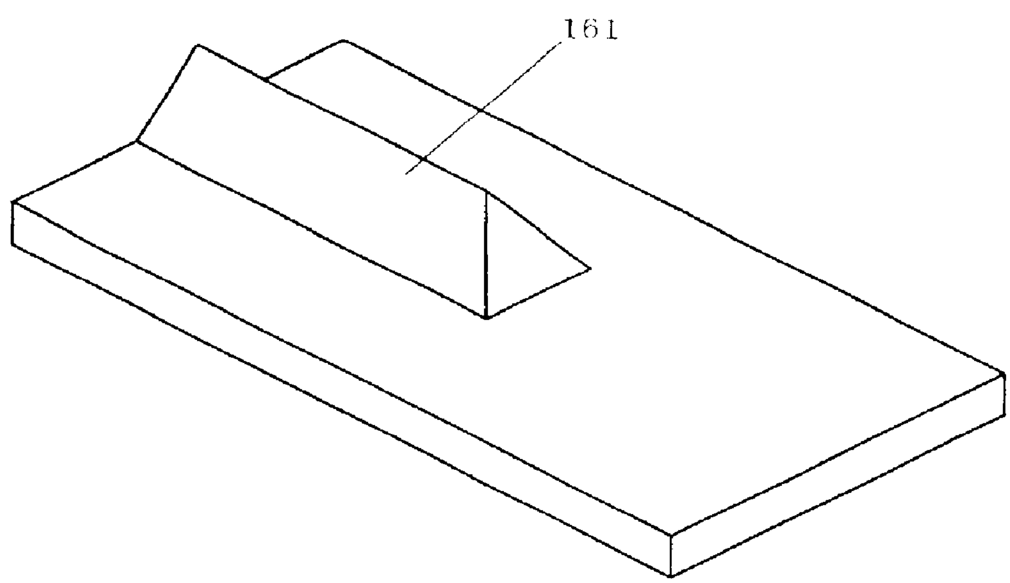

F I G. 1 9 PRIOR ART
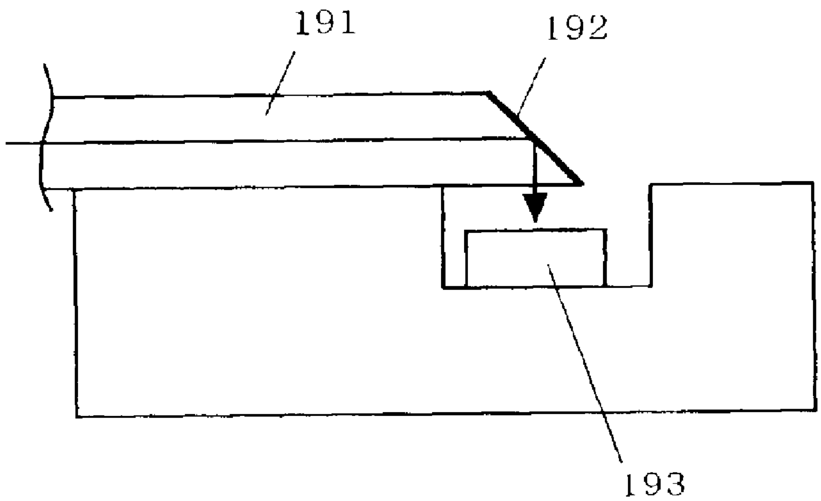
F I G. 2 0 PRIOR ART
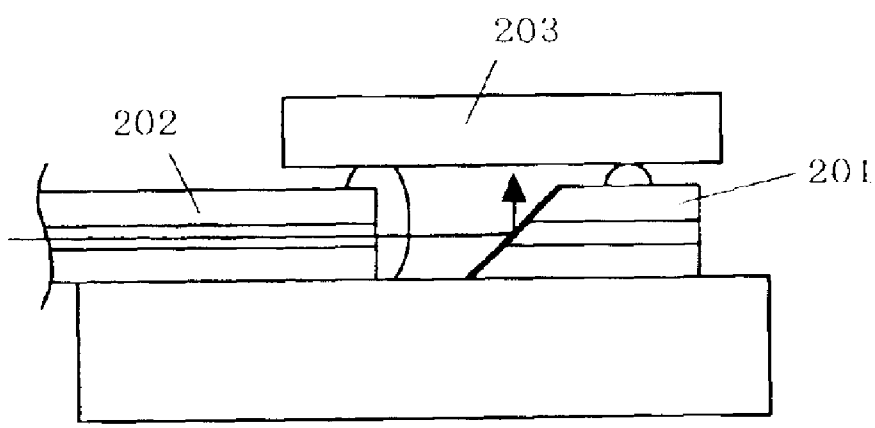

OPTICAL PACKAGE SUBSTRATE AND OPTICAL DEVICE

BACKGROUND OF THE INVENTION

1. Field of the Invention

The present invention relates to an optical package substrate and an optical device, and more particularly to a package substrate having a surface configuration which is suitable for mounting optical components and/or optical elements thereon, a method for molding such a package substrate, and an optical device which is constructed by employing the package substrate.

2. Description of the Background Art

Optical communication systems employing optical fibers are evolving from conventional long haul communication systems into subscriber communication systems. Subscriber-type optical communication systems require the use of small and inexpensive optical devices.

In conventional optical devices, optical components such as optical fibers and/or lenses and optical elements such as lasers and/or photodiodes are deployed in a coaxial arrangement. Usually, the positioning of the optical fibers and lenses requires a high precision, e.g., a tolerance of ±1 μm. Therefore, a so-called active alignment technique has been used for the assembly of an optical device, where the positioning of the components is adjusted while driving the optical elements with laser light actually being led therethrough. However, this technique requires complicated tasks, and is time-consuming, thus presenting substantial cost problem.

On the other hand, a so-called passive alignment, in which the components are positioned without the aforementioned adjustment, has attracted attention as a technique for simplifying the assembly of an optical device. Typical examples of this technique are used in optical devices such that light that is guided through optical fibers and optical cavities is deflected by 90° so as to be received by a photodiode of a surface reception type. Various ideas have been proposed for this technique, in documents such as Japanese Patent Laid-Open Publication No. 11-326662 and Japanese Patent No. 2687859.

FIG. 19 is a cross-sectional view showing an exemplary optical device structure which utilizes a conventionally-proposed deflection method.

As shown in FIG. 19, an end face of an optical fiber (or an optical waveguide) 191 is ground (angled) at 45°, with a reflection mirror 192 being provided on this end face. Light that is guided through the optical fiber (optical waveguide) 191 which is incident from the left direction in FIG. 19 has its optical path turned (i.e., deflected) by 90° at the mirror 192 so as to be received by the photodiode 193. The photodiode 193 may be of a surface reception type as that shown in FIG. 19, or of a different type called a "waveguide type".

A surface reception type photodiode has a large area for receiving light, so that it requires a positioning precision of only about ± tens of microns (μm) with respect to an optical fiber or an optical waveguide. Therefore, the mounting of a surface reception type photodiode can be realized through a passive alignment, which involves forming markers on the substrate as reference points for the mounting process. However, when light which is guided through the optical fiber or optical waveguide needs to be received directly at the front face of the surface reception type photodiode, it is necessary to mount the surface reception type photodiode in an upright position on the substrate, which makes mass production more difficult. An example of this situation is the monitoring of a laser output, where surface reception type photodiodes are a common choice.

On the other hand, a waveguide type photodiode has a light receiving layer on the order of several microns. Therefore, a positioning precision as stringent as ±1 μm is required in order to ensure that light guided through an optical fiber or optical waveguide is properly coupled to a waveguide type photodiode. Thus, active alignment is usually employed for waveguide type photodiodes, thereby presenting a substantial mounting cost problem.

Thus, it can be seen that the construction shown in FIG. 19, where light which exits from an optical fiber or optical waveguide is deflected by 90°, can be highly effective in terms of mass production and mounting costs, because it makes it possible to mount a surface reception type photodiode in a face-down manner through passive alignment.

FIG. 20 shows another exemplary optical device structure utilizing the conventional deflection method described in Japanese Patent Laid-Open Publication No. 11-326662.

Referring to FIG. 20, this optical device features a reflective member 201, which is formed by processing a portion of an optical waveguide into a reflective surface for reflecting light. Light which is propagated through the waveguide layer 202 to exit at its end face is deflected by 90° so as to be received by a surface reception type photodiode 203.

As illustrated by the above two examples, conventional optical device structures are based on the concept of deflecting an optical path of light exiting from an optical fiber or optical waveguide so as to allow the exiting light to be received by a surface reception type photodiode, which requires a relatively low receiving positioning precision, with a view towards reducing the device cost.

However, the conventional optical device structures illustrated in FIGS. 19 and 20 require an additional process of working an end face of an optical fiber (or an optical waveguide) into a face having a 45° slope. Moreover, in order to minimize the scattering loss at the processed surface, it is essential to secure a high planar precision, and as a result, processes such as grinding, dry etching, wet etching and cutting must be carried out with a good reproducibility. Especially in the case where an optical fiber processed so as to have a slanting end face is employed, light exiting from the optical fiber may not be properly incident on a photodiode if the optical fiber fails to be mounted in the correct orientation, due to rotation or the like.

Thus, while conventional optical device structures provide advantages that are associated with simplified photodiode mounting, they also require additional processing steps, which detract from the cost advantages.

SUMMARY OF THE INVENTION

Therefore, an object of the present invention is to provide an easy-to-manufacture optical package substrate which allows for easy mounting of optical elements such as photodiodes and lasers and which is excellent in functionality, producibility and economy, and a method for molding such an optical package substrate. Another object of the present invention is to provide an optical device which is constructed by employing the package substrate.

The present invention has the following features to attain the above-described objects.

A first aspect of the present invention is directed to an optical package substrate for mounting an optical component and/or an optical element thereon. The optical package substrate of the first aspect comprises: a guide section for fixing an optical axis of an optical fiber which is mounted in the guide section, where the guide section is a groove that is formed on a surface of a substrate and extending from an end face of the substrate to a predetermined portion of the substrate; and an optical path deflection section for deflecting an optical path by reflection, where the optical path deflection section is formed at the predetermined portion of the guide section so as to be in a position intersecting the optical axis of the optical fiber which is mounted in the guide section.

Thus, according to the first aspect, a guide section which is used for the positioning of an optical fiber, and an optical path deflection section for deflecting light through reflection are concurrently molded onto an optical package substrate. As a result, a passive alignment of an optical component and an optical element can be easily realized without requiring any additional processing steps.

A second aspect according to the present invention is directed to an optical package substrate for mounting an optical component and/or an optical element thereon. The optical package subtract of the second aspect comprises: a waveguide section as a groove that is formed on a surface of a substrate and extending from an end face of the substrate to a predetermined portion of the substrate, where the waveguide section corresponds to a predetermined optical waveguide core pattern; and an optical path deflection section for deflecting an optical path by reflection, where the optical path deflection section is formed at the predetermined portion of the waveguide section so as to be in a position intersecting an optical axis of the optical waveguide defined in the waveguide section.

Thus, according to the second aspect, a waveguide section corresponding to an optical waveguide core pattern and an optical path deflection section for deflecting light through reflection are concurrently molded onto an optical package substrate. As a result, a passive alignment of an optical component and an optical element can be easily realized without requiring any additional processing steps.

A third aspect according to the present invention is directed to an optical package substrate for mounting an optical component and/or an optical element thereon. The optical package substrate of the third aspect comprises: a stage portion for fixing an optical axis of a light receiving/emitting element which is mounted on the stage portion, where the stage portion is formed on a surface of a substrate; and an optical path deflection section for deflecting an optical path by reflection, where the optical path deflection section is formed on the surface of the substrate so as to be in a position intersecting the optical axis of the light receiving/emitting element which is mounted on the stage portion.

Thus, according to the third aspect, a stage portion, which is used for the positioning of a light receiving/emitting element, and an optical path deflection section for deflecting light through reflection are concurrently molded onto an optical package substrate. As a result, a passive alignment of an optical component and an optical element can be easily realized without requiring any additional processing steps.

According to a fourth aspect of the present invention, in accordance with the third aspect, a waveguide section is further comprised which is formed on the surface of the substrate, where the waveguide section corresponds to an optical waveguide core pattern having an optical axis coinciding with an optical axis of the light receiving/emitting element which is mounted on the stage portion.

Thus, according to the fourth aspect, a waveguide section corresponding to an optical waveguide core pattern, a stage portion, and an optical path deflection section are concurrently molded onto an optical package substrate. As a result, a passive alignment of an optical component and an optical element can be easily realized without requiring any additional processing steps.

Preferably, a thin film element having a mirror property is provided on the optical path deflection section. As a result, it becomes possible not only to merely reflect light at the optical path deflection section, but also to obtain a different reflectance depending on the wavelength of the light.

Alternatively, a diffraction grating for creating different optical paths for different optical wavelengths is provided on the optical path deflection section. As a result, by utilizing the properties of a diffraction grating having different diffraction angles for different wavelengths, an optical device comprising a filtering function for receiving light of only a specific wavelength can be realized.

Alternatively, the optical path deflection section has a curvature for converging a plurality of incident rays through reflection. As a result, the positioning precision for a light receiving element can be further relaxed, or light that is emitted from a surface emission type light emitting element can be converged so as to be coupled to an optical fiber or an optical waveguide with a high efficiency.

The optical package substrate preferably comprises glass. By employing glass, it becomes possible to form a highly precise configuration on a surface by means of a die, and excellent stability can be provided in various environments. Since glass is transmissive to UV rays, the fixing of an optical fiber or the like can be achieved by using a UV-curing adhesive, instead of a time-consuming thermosetting adhesive.

Furthermore, the optical package substrate may be molded by pressing a die against a substrate material which is softened by being heated to a high temperature to transcribe an inverted pattern of the die onto the substrate material, the die having been obtained by using a normal-grinding tool and an arbitrary fine-grinding tool, wherein at least one of the die and the fine-grinding tool is obtained through microdischarge machining.

By producing a die having a complicated configuration through microdischarge machining employing this method for producing an optical package substrate, which would have been highly difficult to obtain by a conventional grinding process, the optical package substrate according to the present invention can be obtained.

A fifth aspect according to the present invention is directed to an optical device having an optical component and/or optical element mounted on an optical package substrate. The optical package substrate of the fifth aspect comprises: a guide section for fixing an optical axis of an optical fiber which is mounted in the guide section, where the guide section is a groove that is formed on a surface of a substrate and extending from an end face of the substrate to a predetermined portion of the substrate; and an optical path deflection section for deflecting an optical path by reflection, where the optical path deflection section is formed at the predetermined portion of the guide section so as to be in a position intersecting the optical axis of the optical fiber which is mounted in the guide section. Further, according to the fifth aspect, the optical fiber that is placed in the guide section on the optical package substrate is pressed from above by a predetermined substrate, and as a result, the optical fiber is affixed to the optical package substrate.

Thus, according to the fifth aspect, an optical fiber can be firmly mounted on an optical package substrate, and an optical device which is capable of deflecting light that is propagated through an optical fiber can be produced from the optical package substrate through very simple steps, thereby leading to excellent productivity and economy. It is also possible to employ a predetermined substrate as a stage on which to mount a photodiode, a laser, or the like.

A sixth aspect according to the present invention is directed to an optical device having an optical component and/or optical element mounted on an optical package substrate. The optical package substrate of the sixth aspect comprises: a waveguide section as a groove that is formed on a surface of a substrate and extending from an end face of the substrate to a predetermined portion of the substrate, where the waveguide section corresponds to a predetermined optical waveguide core pattern; and an optical path deflection section for deflecting an optical path by reflection, where the optical path deflection section is formed at the predetermined portion of the waveguide section so as to be in a position intersecting an optical axis of the optical waveguide which is defined in the waveguide section. The optical device of the sixth aspect further comprises a predetermined substrate, wherein a core material having a refractive index which is higher than a refractive index of the optical package substrate is filled in the waveguide section of the optical package substrate, and thereafter, an adhesive having a refractive index which is lower than the refractive index of the core material is used to attach the predetermined substrate to the waveguide section.

Thus, according to the sixth aspect, by filling a core material having a high refractive index in a waveguide section so that the waveguide section functions as an optical waveguide, an optical device which is capable of deflecting light that is propagated through an optical fiber can be produced from the optical package substrate through very simple steps, thereby leading to excellent productivity and economy.

A seventh aspect according to the present invention is directed to an optical device having an optical component and/or optical element mounted on an optical package substrate. The optical package substrate of the seventh aspect comprises: a stage portion for fixing an optical axis of a light receiving/emitting element which is mounted on the stage portion, where the stage portion is formed on a surface of a substrate; and an optical path deflection section for deflecting an optical path by reflection, where the optical path deflection section is formed on the surface of the substrate so as to be in a position intersecting the optical axis of the light receiving/emitting element which is mounted on the stage portion, wherein the light receiving/emitting element is affixed to the stage portion which is formed on the optical package substrate.

Thus, according to the seventh aspect, an optical device which is capable of realizing optical coupling between a light receiving/emitting element and another optical element can be produced from an optical package substrate through very simple steps, by simply affixing a light receiving/emitting element on a stage portion through passive alignment. Thus, excellent productivity and economy can be obtained.

According to an eighth aspect of the present invention, in accordance with the seventh aspect, the optical package substrate further comprises a waveguide section which is formed on the surface of the substrate. The waveguide section corresponds to an optical waveguide core pattern having an optical axis coinciding with an optical axis of the light receiving/emitting element mounted on the stage portion. Moreover, according to the eighth aspect, the optical device further comprises a predetermined substrate, wherein a core material having a refractive index which is higher than a refractive index of the optical package substrate is filled in the waveguide section of the optical package substrate, and thereafter, an adhesive having a refractive index which is lower than the refractive index of the core material is used to attach the predetermined substrate to the waveguide section.

Thus, according to the eighth aspect, an optical device which is capable of realizing optical coupling between a light receiving/emitting element and another optical element can be produced from an optical package substrate through very simple steps, by simply affixing a light receiving/emitting element on a stage portion through passive alignment. Thus, excellent productivity and economy can be obtained.

The optical device may further comprise a surface mounting type light receiving/emitting element which is optically coupled to the optical fiber that is affixed in the guide section through the optical path deflected by the optical path deflection section. Alternatively, the optical device may further comprise a surface mounting type light receiving/emitting element which is optically coupled to the optical waveguide that is defined in the waveguide section through the optical path deflected by the optical path deflection section. Alternatively, the optical device may further comprise a surface mounting type light receiving/emitting element which is optically coupled to the light receiving/emitting element that is affixed to the stage portion through the optical path deflected by the optical path deflection section. Thus, since the light receiving/emitting element is of a surface mounting type, the light receiving/emitting element can be mounted even with a relaxed positioning precision. As a result, adjustment-free mounting can be easily realized.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a perspective view illustrating the configuration of an optical package substrate according to a second embodiment of the present invention;

FIG. 4 is a cross-sectional view illustrating an optical device incorporating the optical package substrate according to the second embodiment;

FIG. 5 is a perspective view illustrating the configuration of an optical package substrate according to a third embodiment of the present invention;

FIG. 6 is a cross-sectional view illustrating an optical device incorporating the optical package substrate according to the third embodiment;

FIG. 7 is a perspective view illustrating the configuration of an optical package substrate according to a fourth embodiment of the present invention;

FIG. 8 includes a perspective view and a cross-sectional view illustrating an optical device incorporating the optical package substrate according to the fourth embodiment;

FIG. 9A and FIG. 9B are diagrams illustrating a method for forming an optical waveguide utilizing a waveguide channel on an optical package substrate;

FIG. 12 is a perspective view illustrating the configuration of an optical package substrate according to a sixth embodiment of the present invention;

FIG. 13 includes a perspective view and a cross-sectional view illustrating an optical device incorporating the optical package substrate according to the sixth embodiment;

FIG. 14 is a schematic diagram illustrating general principles of discharge machining;

FIG. 15 is a diagram illustrating a method for fine-processing a tool electrode through microdischarge machining;

FIG. 16 is a perspective view illustrating a die which is used for the molding of the optical package substrate according to the first embodiment;

FIG. 19 and FIG. 20 are cross-sectional views illustrating conventional optical devices incorporating optical package substrates.

DETAILED DESCRIPTION OF THE PREFERRED EMBODIMENTS

Hereinafter, illustrative embodiments of the present invention will be described with reference to the drawings.

First Embodiment

Figure 1:
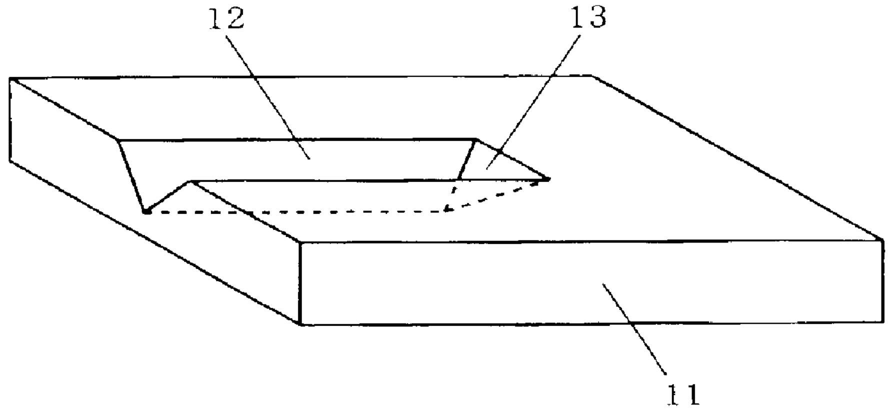
FIG. 1 is a perspective view illustrating the configuration of an optical package substrate according to a first embodiment of the present invention.

FIG. 1 is a perspective view illustrating the configuration of an optical package substrate 11 according to a first embodiment of the present invention. As shown in FIG. 1, a guide groove 12 for positioning an optical fiber is formed on the surface of the optical package substrate 11, with a tapered face 13 being formed so as to adjoin the guide groove 12. The tapered face 13 constitutes a predetermined angle with respect to the surface of the optical package substrate 11.

Figure 2:
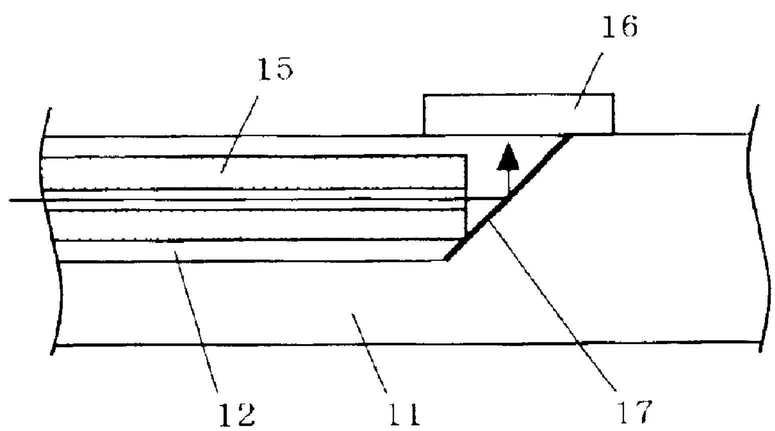
FIG. 2 is a cross-sectional view illustrating an optical device incorporating the optical package substrate according to the first embodiment.

FIG. 2 is a cross-sectional view illustrating an optical device incorporating the optical package substrate 11 of FIG. 1, with an optical fiber 15 and a surface reception type photodiode 16 being mounted thereon.

As shown in FIG. 2, the optical device structure incorporating the optical package substrate 11 includes a mirror 17, which is composed of a thin film capable of reflecting light and which is formed on the tapered face 13. The optical fiber is affixed in the guide groove 12 by using an ultraviolet (UV)-curing resin, for example. The optical fiber 15 only needs to be placed within the guide groove 12, but is preferably placed in such a manner that an end face thereof abuts against the tapered face 13, as shown in FIG. 2. Above the tapered face 13 is mounted the surface reception type photodiode 16, which is placed in a position for receiving light that is deflected by the mirror 17 provided on the tapered face 13. By providing a positioning marker (not shown) for a light receiving element on the optical package substrate 11, it becomes particularly easy to mount the surface reception type photodiode 16 through passive alignment.

In accordance with this structure, light which is propagated through the optical fiber 15 in the left to right direction in FIG. 2 exits the optical fiber 15 at the right end face of the optical fiber 15, and thereafter is reflected from the mirror 17 provided on the tapered face 13, so as to enter the surface reception type photodiode 16 (see the arrow in FIG. 2). Thus, the optical device shown in FIG. 2 incorporating the optical package substrate 11 functions as a light receiving module, As described above, by employing the optical package substrate 11 according to the first embodiment of the present invention, it is possible to produce an optical device which is capable of easily deflecting the light which exits the optical fiber 15. Moreover, there is no need to watch the rotation of the optical fiber 15 during the mounting of a component.

The mirror 17 on the tapered face 13 may be formed by directly applying a metal film through a plating or vacuum process. Alternatively, a mirror which is previously formed on another substrate may be attached by adhering the substrate onto the tapered face 13. Instead of a mirror, a multilayer film filter which reflects light of a target optical wavelength may be formed on the tapered face 13.

In practice, the aforementioned angle of the tapered face 13 is preferably in the range of about 30° to about 70°. In particular, in the case where a multilayer film filter is formed on the tapered face 13, it is preferable that the angle is about 60° or more so as to minimize any fluctuations in characteristics associated with polarization.

Furthermore, the cross section of the guide groove 12 is not limited to a V shape. Rather, any cross sectional shape may be used which permits the optical fiber 15 to be positioned therein, e.g., rectangular, semicircular, or like shapes.

Instead of the aforementioned optical fiber 15, an optical fiber 191 shown in FIG. 19 may be employed, which is provided with a mirror that is ground at a predetermined angle on one end face; in this case, it is unnecessary to form the mirror 17 on the tapered face 13. Even when such an optical fiber 191 is employed, the tapered face 13 which is formed on the optical package substrate 11 prevents the rotation of the optical fiber 191 during the mounting of a component.

Second Embodiment

FIG. 3 is a perspective view illustrating the configuration of an optical package substrate 31 according to a second embodiment of the present invention. As shown in FIG. 3, a guide groove 32 for positioning an optical fiber is formed on the surface of the optical package substrate 31, with a tapered face 33 being formed so as to adjoin the guide groove 32. The tapered face 33 constitutes a predetermined angle with respect to the surface of the optical package substrate 31. The surface of the package substrate 31 is staggered at the slope 34.

FIG. 4 is a cross-sectional view illustrating an optical device incorporating the optical package substrate 31 shown in FIG. 3, on which an optical fiber 35 and a surface reception type photodiode 36 are mounted.

In the optical device structure shown in FIG. 4 incorporating the optical package substrate 31, a diffraction grating 37 for causing optical diffraction is provided on the tapered face 33. The optical fiber 35 is affixed in the guide groove 32. The optical fiber 35 only needs to be placed within the guide groove 32, but is preferably placed in such a manner that an end face of the optical fiber 35 abuts against the tapered face 33, as shown in FIG. 4. The optical fiber 35 is pressed in place by means of a flat glass plate 38, which in itself is placed so as to abut against the slope 34. Above the flat glass plate 38 is mounted a patterned absorption film 39 having an aperture. The surface reception type photodiode 36 is mounted in a face-down manner, with a sensor portion of the surface reception type photodiode 36 being aligned with the aperture in the absorption film 39. By providing a positioning marker (not shown) for a light receiving element on the absorption film 39, it becomes particularly easy to mount the surface reception type photodiode 36 through passive alignment. The optical fiber 35 and the flat glass plate 38 may be fixed by using UV-curing resin, for example.

In accordance with this structure, light which is propagated through the optical fiber 35 in the left to right direction in FIG. 4 exits the optical fiber 35 at its right end face, and thereafter is diffracted by the diffraction grating 37 which is provided on the tapered face 33. The diffraction grating 37 functions to provide different diffraction angles depending on the wavelength of the light which propagates through the optical fiber 35. Therefore, by inserting the absorption film 39 between the diffraction grating 37 and the surface reception type photodiode 36, it becomes possible to ensure that light of only a specific wavelength is received at the surface reception type photodiode 36 (see the arrows in FIG. 4). Thus, the optical device shown in FIG. 4 incorporating the optical package substrate 31 functions as a light receiving module having a wavelength selecting function.

As described above, by employing the optical package substrate 31 according to the second embodiment of the present invention, it is possible to produce an optical device which is capable of easily deflecting the light that exits the optical fiber 35 and which is capable of wavelength selection. Moreover, there is no need to watch the rotation of the optical fiber 35 during the mounting of a component.

The diffraction grating 37 that is provided on the tapered face 33 may be formed by directly processing the tapered face 33. Alternatively, a diffraction grating which is previously formed on another substrate may be attached by adhering the substrate onto the tapered face 33. It is particularly preferable to form an inverted pattern of a desired diffraction grating on a tapered face of a die for use in the molding of the optical package substrate, and then to perform a press formation of the optical package substrate in such a manner that the diffraction grating 37 is molded concurrently with other portions.

In practice, the aforementioned angle of the tapered face 33 is preferably in the range of about 30° to about 70°.

In order to enhance the accuracy of wavelength separation, the aperture of the absorption film 39 may be made narrower, or the thickness of the flat glass plate 38 may be increased.

Furthermore, the cross section of the guide groove 32 is not limited to a V shape. Rather, any cross sectional shape may be used which permits the optical fiber 35 to be positioned therein, e.g., rectangular, semicircular, or like shapes.

Third Embodiment

FIG. 5 is a perspective view illustrating the configuration of an optical package substrate 51 according to a third embodiment of the present invention. As shown in FIG. 5, a guide groove 52 for positioning an optical fiber is formed on the surface of the optical package substrate 51, with a predetermined tapered face 53 being formed so as to adjoin the guide groove 52.

FIG. 6 is a cross-sectional view illustrating an optical device incorporating the optical package substrate 51 shown in FIG. 5, on which an optical fiber 55 and a surface emission type laser 56 are mounted.

As shown in FIG. 6, the optical device structure incorporating the optical package substrate 51 includes a tapered face 53 having a lens-like curvature, with a mirror 57 being composed of a thin film which is capable of reflecting light formed on the surface of the tapered face 53. The optical fiber 55 is affixed in the guide groove 52. The optical fiber 55 only needs to be placed within the guide groove 52, but is preferably placed in such a manner that an end face of the optical fiber 55 abuts against the tapered face 53, as shown in FIG. 6. The optical fiber 55 is pressed in place by means of a flat glass plate 58. The flat glass plate 58 is positioned by using a marker (not shown) which is previously provided on the optical package substrate 51. Above the flat glass plate 58 is mounted the surface emission type laser 56, which is placed in a position for receiving light that is deflected by the mirror 57 provided on the tapered face 53. By providing a positioning marker (not shown) for a light emitting element on the flat glass plate 58, it becomes easy to mount the surface emission type laser 56 through passive alignment. In other words, by performing the alignment between the flat glass plate 58 and the optical package substrate 51 and by performing the alignment between the flat glass plate 58 and the surface emission type laser 56 each based on a marker, it becomes possible to align the surface emission type laser 56 with respect to the optical package substrate 51. The optical fiber 55 and the flat glass plate 58 may be fixed by using UV-curing resin, for example.

In accordance with this structure, light exiting the surface emission type laser 56 arrives at the tapered face 53 as the propagating light spreads out. The arriving light is reflected and converged by the mirror 57 which is provided on the tapered face 53, so as to be coupled to the optical fiber 55 (see the arrows in FIG. 6). Thus, the optical device shown in FIG. 6 in corporating the optical package substrate 51 functions as a light transmitting module.

By replacing the surface emission type laser 56 with a surface reception type photodiode, the optical device can function as a light receiving module for causing light exiting the optical fiber 55 to be reflected and converged by the mirror 57 so as to enter the surface reception type photodiode.

As described above, by employing the optical package substrate 51 according to the third embodiment of the present invention, it is possible to produce an optical device which is capable of easily deflecting the light that exits the surface emission type laser 56 so as to be coupled to the optical fiber 55. Moreover, there is no need to watch the rotation of the optical fiber 55 during the mounting of a component.

The mirror 57 which is provided on the tapered face 53 may be formed by directly applying a metal film through a plating or vacuum process. Alternatively, a mirror which is previously formed on another substrate may be attached by adhering the substrate onto the tapered face 53. Instead of a mirror, a multilayer film filter which reflects light of a target optical wavelength may be formed on the tapered face 53.

Furthermore, the cross section of the guide groove 52 is not limited to a V shape. Rather, any cross sectional shape may be used which permits the optical fiber 55 to be positioned therein, e.g., rectangular, semicircular, or like shapes.

Fourth Embodiment

The above-described first to third embodiments each illustrate an optical package substrate comprising a guide groove for fixing an optical fiber. In each of the following embodiments, an optical package substrate and an optical device are illustrated, and the optical package substrate and the optical device are provided with a waveguide channel corresponding to an optical waveguide core pattern which functions to contain light within the core and which allows the light to be propagated therethrough in the manner of an optical fiber.

FIG. 7 is a perspective view illustrating the configuration of an optical package substrate 71 according to a fourth embodiment of the present invention. As shown in FIG. 7, a waveguide channel 72 corresponding to an optical waveguide core pattern is formed on the surface of the optical package substrate 71, with a tapered face 73 being formed so as to adjoin the waveguide channel 72. The tapered face 73 constitutes a predetermined angle with respect to the surface of the optical package substrate 71. The surface of the optical package substrate 71 is staggered so as to result in a predetermined level difference between a plane on which the waveguide channel 72 is formed and another plane.

FIG. 8 includes a perspective view and a cross-sectional view illustrating an optical device incorporating the optical package substrate 71 shown in FIG. 7, on which a surface reception type photodiode 76 is mounted.

A method for forming an optical waveguide in the waveguide channel 72 will now be described with reference to FIGS. 9A and 9B. FIGS. 9A and 9B show a cross-sectional view of an optical waveguide which is formed in the optical package substrate 71.

First, a transparent base material 91 with a UV-curing adhesive 92 being thinly applied thereon is prepared. The transparent base material 91 has a refractive index that is similar to the refractive index of the optical package substrate 71 in which the waveguide channel 72 is formed, whereas the UV-curing adhesive 92 has a refractive index that is higher than the refractive indexes of the optical package substrate 71 and the transparent base material 91 (FIG. 9A). Then, the transparent base material 91 is attached to the optical package substrate 71 in such a manner that the face of the transparent base material 91 on which the UV-curing adhesive 92 is applied faces the waveguide channel 72 (FIG. 9B). Finally, the transparent base material 91 and the optical package substrate 71 are irradiated with UV rays so that they adhere to each other. According to this formation method, by ensuring that the layer of adhesive which is present in portions other than the waveguide channel 72 created as a result of the above-described attachment is sufficiently thin, the UV-curing adhesive 92 which is embedded within the waveguide channel 72 can be allowed to function as an optical waveguide.

In the optical device structure incorporating the optical package substrate 71 illustrated in FIG. 8, the flat glass plate 78 is attached to the optical package substrate 71 via a UV-curing adhesive so as to overlie the waveguide channel 72, where the UV-curing adhesive is selected to have a higher refractive index than the refractive indexes of the optical package substrate 71 and the flat glass plate 78, as described above. As a result, the waveguide channel 72 functions as an optical waveguide. The thickness of the flat glass plate 78 is preferably set so that its upper face (as attached to the optical package substrate 71) lies flush with the other plane of the optical package substrate 71. A mirror 77 composed of a thin film which is capable of reflecting light is formed on the tapered face 73. Above the optical package substrate 71 and the flat glass plate 78 is formed the surface reception type photodiode 76, which is placed in a position for receiving light that is deflected by the mirror 77 which is provided on the tapered face 73. By providing a positioning marker (not shown) for a light receiving element on the optical package substrate 71 or the flat glass plate 78, it becomes particularly easy to mount the surface reception type photodiode 76 through passive alignment.

In accordance with this structure, light which is propagated through the optical waveguide defined in the waveguide channel 72 in the left to right direction in FIG. 8 exits the optical waveguide at its right end face, and thereafter is reflected from the mirror 77 which is provided on the tapered face 73, so as to enter the surface reception type photodiode 76 (see the arrow in FIG. 8). Thus, the optical device shown in FIG. 8 incorporating the optical package substrate 71 functions as a light receiving module.

As described above, by employing the optical package substrate 71 according to the fourth embodiment of the present invention, an optical waveguide can be easily formed, and it is possible to produce an optical device which is capable of easily deflecting the light which exits the optical waveguide.

Fifth Embodiment

Figure 10:
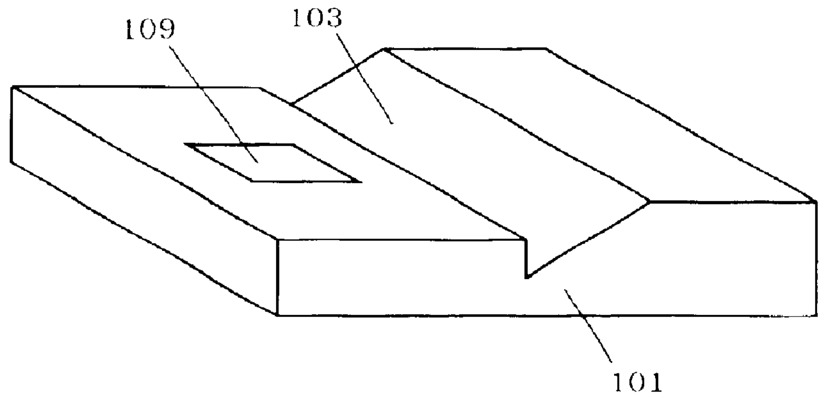
FIG. 10 is a perspective view illustrating the configuration of an optical package substrate according to a fifth embodiment of the present invention.

FIG. 10 is a perspective view illustrating the configuration of an optical package substrate 101 according to a fifth embodiment of the present invention. As shown in FIG. 10, a stage 109 for positioning a laser is formed on the surface of the optical package substrate 101, with a tapered face 103 being formed. The tapered face 103 constitutes a predetermined angle with respect to the surface of the optical package substrate 101. The surface of the optical package substrate 101 is staggered so as to result in a predetermined level difference between a plane on which the stage 109 is formed and another plane.

Figure 11:
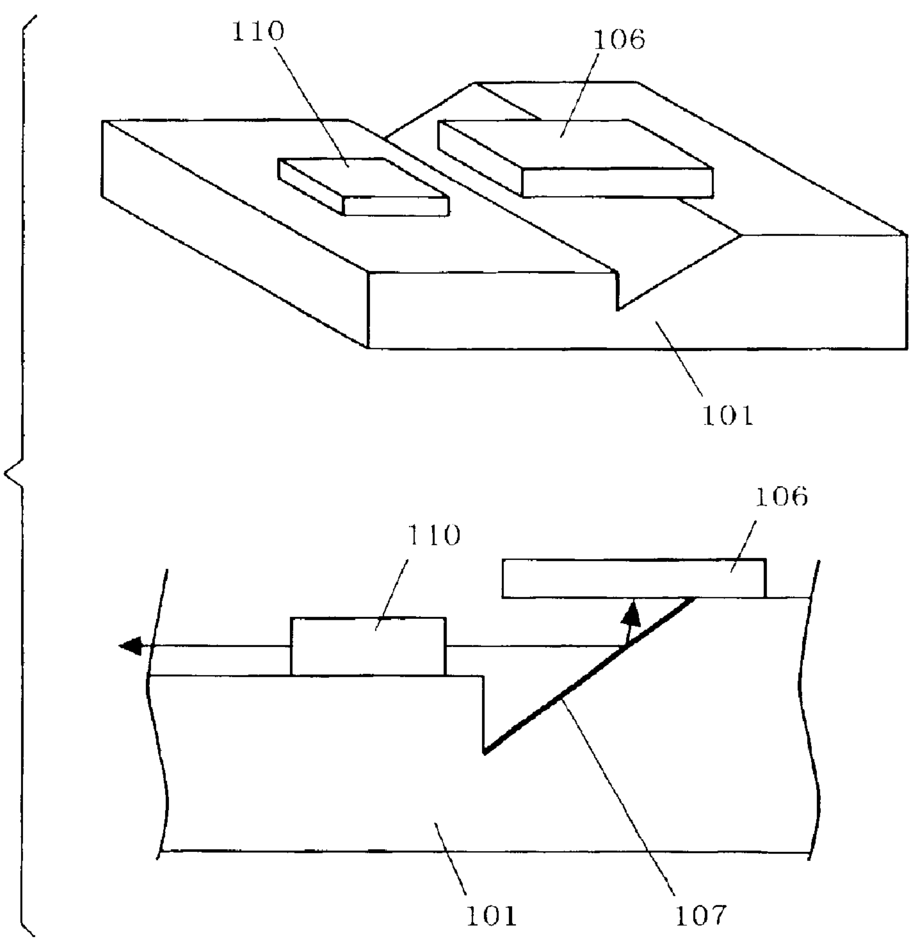
FIG. 11 is a cross-sectional view illustrating an optical device incorporating the optical package substrate according to the fifth embodiment.

FIG. 11 includes a perspective view and a cross-sectional view illustrating an optical device incorporating the optical package substrate 101 shown in FIG. 10, on which a waveguide type laser 110 and a surface reception type photodiode 106 are mounted.

As shown in FIG. 11, the optical device structure incorporating the optical package substrate 101 includes a mirror 107 composed of a thin film which is capable of reflecting light, which mirror 107 is formed on the tapered face 103. The waveguide type laser 110 is mounted on the stage 109 through passive alignment, with reference to a positioning marker (not shown) which is provided on the stage 109. The plane of the optical package substrate 101 on which the stage 109 is formed is configured so that light exiting the waveguide type laser 110 placed thereon is incident on the tapered face 103. The surface reception type photodiode 106 is also mounted through passive alignment, with reference to a positioning marker (not shown) which is provided on the optical package substrate 101, so as to be placed in a position for receiving light that is deflected by the mirror 107 which is provided on the tapered face 103.

In accordance with this structure, principal light which is emitted from the waveguide type laser 110 in the left direction in FIG. 11 is coupled to an optical fiber (not shown) via a lens or the like, whereas subordinate light which is emitted in the right direction in FIG. 11 is reflected from the mirror 107 which is provided on the tapered face 103, so as to enter the surface reception type photodiode 106 (see the arrows in FIG. 11). Thus, the optical device shown in FIG. 11 incorporating the optical package substrate 101 functions as a light transmitting module which permits the optical output from the waveguide type laser 110 to be monitored.

As described above, by employing the optical package substrate 101 according to the fifth embodiment of the present invention, it is possible to produce an optical device which is capable of easily deflecting the light that is emitted from the waveguide type laser 110 and permitting the intensity of the laser light to be monitored.

Sixth Embodiment

FIG. 12 is a perspective view illustrating the configuration of an optical package substrate 121 according to a sixth embodiment of the present invention. As shown in FIG. 12, a waveguide channel 122, which corresponds to an optical waveguide core pattern, and a stage 129 for positioning a laser are formed on the surface of the optical package substrate 121, with a tapered face 123 also being formed. The tapered face 123 constitutes a predetermined angle with respect to the surface of the optical package substrate 121. The surface of the optical package substrate 121 is staggered so as to result in predetermined level differences between a plane on which the waveguide channel 122 is formed, a plane on which the stage 129 is formed, and another plane.

FIG. 13 includes a perspective view and a cross-sectional view illustrating an optical device incorporating the optical package substrate 121 shown in FIG. 12, on which a waveguide type laser 130 and a surface reception type photodiode 126 are mounted.

In the optical device structure incorporating the optical package substrate 121 illustrated in FIG. 13, the flat glass plate 128 is attached to the optical package substrate 121 via a UV-curing adhesive so as to overlie the waveguide channel 122, where the UV-curing adhesive is selected to have a higher refractive index than the refractive indexes of the optical package substrate 121 and the flat glass plate 128, as in the fourth embodiment. As a result, the waveguide channel 122 functions as an optical waveguide. The waveguide type laser 130 is mounted on the stage 129 through passive alignment, with reference to a positioning marker (not shown) which is provided on the stage 129. The plane of the optical package substrate 121 on which the stage 129 is formed is configured so that the optical axis of principal light which is emitted from the waveguide type laser 130 placed thereon coincides with the optical axis of the optical waveguide defined in the waveguide channel 122, and so that the optical axis of subordinate light is incident on the tapered face 123. A mirror 127 composed of a thin film which is capable of reflecting light is formed on the tapered face 123. The surface reception type photodiode 126 is mounted through passive alignment, with reference to a positioning marker (not shown) which is provided on the optical package substrate 121, so as to be placed in a position for receiving light that is deflected by the mirror 127 which is provided on the tapered face 123.

In accordance with this structure, principal light which is emitted from the waveguide type laser 130 in the left direction in FIG. 13 is coupled to the optical waveguide defined in the waveguide channel 122, whereas subordinate light which is emitted in the right direction in FIG. 13 is reflected from the mirror 127 which is provided on the tapered face 123, so as to enter the surface reception type photodiode 126 (see the arrows in FIG. 13). Thus, the optical device shown in FIG. 13 incorporating the optical package substrate 121 functions as a light transmitting module which combines the functions of the optical devices according to the fourth and fifth embodiments.

As described above, by employing the optical package substrate 121 according to the sixth embodiment of the present invention, an optical waveguide can be easily formed, and it is possible to produce an optical device which is capable of coupling principal light emitted from the waveguide type laser 130 to the optical waveguide, easily deflecting the subordinate light, and permitting the intensity of the laser light to be monitored.

In each of the fourth to sixth embodiments, the mirror 77,107, or 127 provided on the tapered face 73,103, or 123 may be formed by directly applying a metal film through a plating or vacuum process. Alternatively, a mirror which is previously formed on another substrate may be attached by adhering the substrate onto the tapered face. Instead of a mirror, a multilayer film filter which reflects light of a target optical wavelength may be formed on the tapered face.

In practice, the aforementioned angle of the tapered face 73, 103, or 123 is preferably in the range of about 30° to about 70°. In particular, in the case where a multilayer film filter is formed on the tapered face, it is preferable that the angle is about 60° or more so as to minimize any fluctuations in characteristics associated with polarization. The tapered face may alternatively be a curved surface.

Optical Package Substrate Molding Method

Lastly, a preferable method for molding the optical package substrates according to the first to sixth embodiments will be described. According to the present method, a die for use in the molding of an optical package substrate is produced, and this resultant die is pressed against a glass material which has been softened by being heated to a high temperature so as to transcribe the configuration of the die to the glass material (press formation), whereby the optical package substrate is molded. Although glass material which is thermally, mechanically, and chemically stable is preferable as the material of the optical package substrate, any other material which permits press formation can also be used. The inventors have confirmed through experimentation that press formation can be successfully performed by pressing an ultra-hard alloy die, on which a protective film composed of a precious metal alloy is formed, against an optical glass substrate which is heated to 580° C. in a nitrogen gas atmosphere.

Hereinafter, a processing method for a die, which constitutes an essential portion in the production of an optical package substrate, specifically a die processing method utilizing microdischarge machining, will be described. For details of microdischarge machining, see The Journal of the Japan Society for Precision Engineering, vol. 61, No. 10, p. 1370 (1995), or Optical Alliance, 1995.3, p. 28.

FIG. 14 is a schematic diagram illustrating general principles of discharge machining. Referring to FIG. 14, a tool electrode 142 attached at the tip of a mandrel 141, which defines a rotation axis, and a work 143 (which functions as an electrode), as an object to be processed, are immersed in an insulation liquid 144. In this commonly-practiced discharge machining, the two electrodes are brought close to each other while applying a predetermined voltage between the tool electrode 142 and the work 143 by means of a discharge generation section 145, thereby causing an electrical discharge through which the work 143 is melted away. As a wider gap is created due to the melting of the work 143, the tool electrode 142 is further advanced by a corresponding distance. This process is repeated in order to process the work 143 into a desired configuration.

A microdischarge machining technique, which is based on similar processing principles, utilizes a special discharge circuit to provide a discharge energy which is about 1/100 of what is normally used, thereby realizing coarse processing on the order of microns and fine processing on the order of sub-microns. This microdischarge machining technique mainly has the following features:

(1) curved surfaces can be processed since the technique is based on non-contact processing;

(2) any electrically conductive material can be processed, regardless of its mechanical hardness;

(3) microprocessing (on the order of 0.1 $\mu$m) is enabled; and (4) microconfigurations can be processed since tools having a diameter of several microns can be used.

In the molding of the optical package substrate according to each embodiment of the present invention, it is important to utilize microdischarge machining to process the configuration of not only the work but also the tool electrode itself, by taking advantage of the fine processing ability of microdischarge machining technique. As a result, a tool electrode of any configuration (e.g., triangular prism or a rectangular prism as well as a cylinder) can be realized in units of several millimeters or more. For example, since the tip of a tool electrode which is composed of sintered diamond or the like can be fine-processed into a cylindrical or conical shape, such a tool electrode can be used for microgrinding a die.

A method for fine processing a tool electrode will now be described with reference to FIG. 15. A processing method which can be adopted in the fine processing of a tool electrode is in itself disclosed in Japanese Patent Laid-Open Publication No. 2001-54808.

Referring to FIG. 15, a shaft-like tool material 152, which is to be processed, is attached to the tip of the mandrel 151. The position of the tool material 152 can be moved up or down along the rotation axis direction by means of a Z stage 157 which is equipped with a motor 156. Within a processing bath 159 which is placed on an X-Y stage 158, an electrode plate 153 for discharge machining is fixed. In the example illustrated in FIG. 15, the electrode plate 153 for discharge machining is fixed so as to be parallel to the Y axis and at an angle of 45° to the X-Y plane. The inside of the processing bath 159 is filled with an insulation liquid 154. A discharge generation section 155 composed of an RC circuit which is capable of generating discharge pulses of a minute energy level is coupled between the tool material 152 and the electrode plate 153 for discharge machining. Thus, it is possible to perform a microdischarge machining on the order of $\mu$m for the tool material 152.

In accordance with the above-described system configuration, the tip of the tool material 152 can be processed into a desired configuration through microdischarge machining while sending the tool material 152, which is rotated (or reciprocated), toward the electrode plate 153 for discharge machining by means of the Z stage 157. FIG. 15 illustrates an example where the tool material 152 is processed so as to have a conical tip while being rotated. Note that sintered diamond for which a metal has been used as a binder can be employed as the tool material 152 because such sintered diamond is electrically conductive.

In order to attain efficiency in die production, the following work will ensue the processing of the tool material 152.

By employing the X-Y stage 158 and the Z stage 157, the processed tool material 152, i.e., the tool electrode, is moved toward the work 160 which has previously been fixed in the processing bath 159, and positioned in place. This positioning can be achieved by detecting electrical conduction between the tool electrode and the work 160, which are gradually brought near to each other. Next, the tool electrode is moved in a desired direction while being rotated so as to be pressed against a portion that is previously processed on the surface of the work 160 which requires precision finishing (i.e., the slopes of a V-shaped protrusion in the example shown in FIG. 15). As a result, the shaping precision and planar precision of the desired portion (i.e., the slopes of the V-shaped protrusion in this example) can be improved.

Figure 17A:
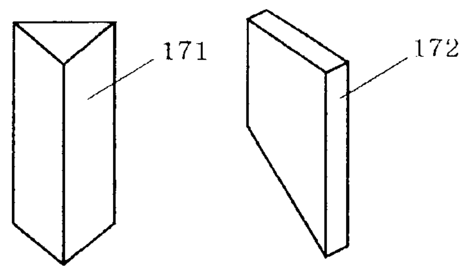
FIG. 17A is a perspective view illustrating exemplary tool electrodes which are fine-processed through microdischarge machining.
Figure 17B:
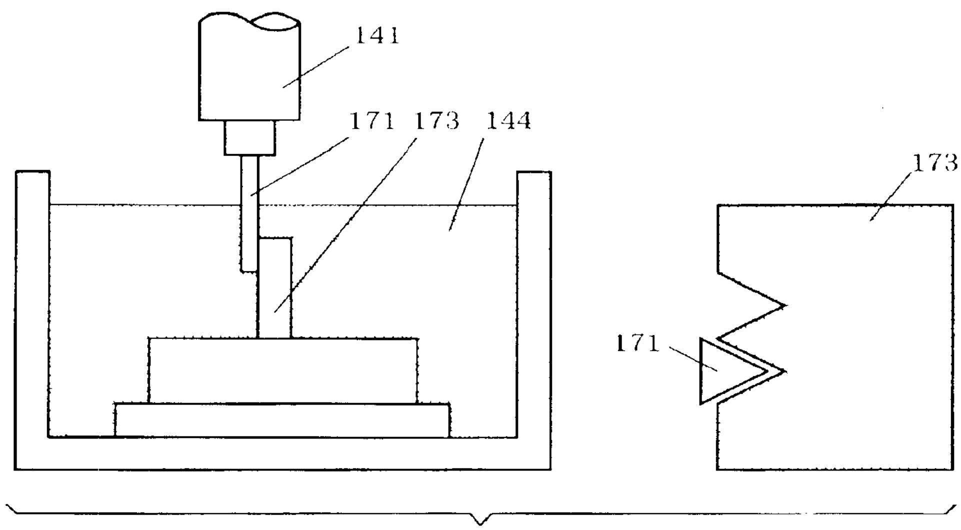
FIG. 17B and FIG. 17C are diagrams illustrating how a die can be made by using the tool electrode shown in FIG. 17A.
Figure 17C:
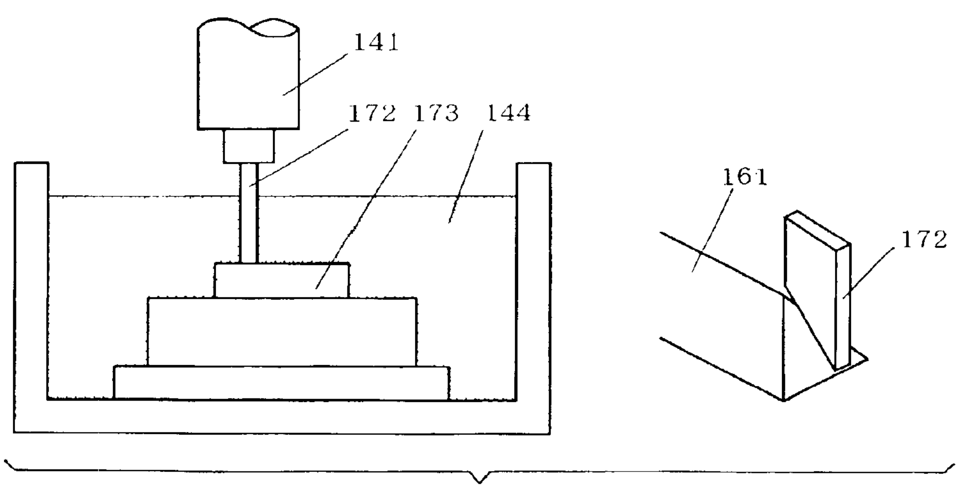

For example, a die to be used for the molding of the optical package substrate 11 according to the first embodiment would have a configuration as shown in FIG. 16, such that a protrusion 161 for molding the guide groove 12 is provided on the surface thereof. In order to form such a protrusion 161 having the shape of a triangular prism on the die, a tool electrode 171 having the shape of a triangular prism and a scalpel-shaped tool electrode 172 as shown in FIG. 17A are first produced. Then, a microdischarge machining process is first performed by using the tool electrode 171 while maintaining the work 173 in an upright position (as shown in the left-hand side of FIG. 17B), and a triangular-prism-like protrusion is coarsely processed on the surface of the work 173 (as shown in the right-hand-side of FIG. 17). Then, while maintaining the work 173 in a lying position, a grinding process is performed by using the tool electrode 172 (as shown in the left-hand side of FIG. 17C), and the protrusion 161 which has been formed on the work 173 is fine-processed (as shown in the right-hand side of FIG. 17C).

Thus, by employing a method which makes use of a fine-processed tool electrode, it becomes possible to realize an ultra-hard alloy die having a sub-micron level shaping precision, which is mirror-finished to a surface coarseness on the order of Ra 20 nm or less, although this has conventionally been impossible. As the planar precision of the die surface improves, the positioning precision of optical fibers or other components (e.g., the planar precision of the guide groove) is improved, and as a result, the performance of the optical coupling efficiency can be improved. Moreover, since an improved planar precision of the die surface facilitates the release process which is associated with molding, the die is exposed to less stress, and as a result, the durability of the die is improved for a higher productivity and economy.

Note that a conventional microgrinder-based grinding process will result in a surface coarseness which is several times the aforementioned value. This is presumably because a grinding process which utilizes a microgrinder naturally requires a continuous and high-speed processing down to a substantial depth, thereby resulting in a lower planar precision of the final plane.

Figure 18A:
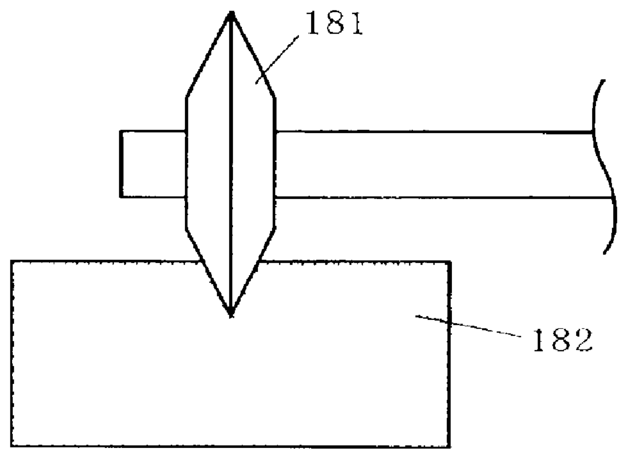
FIG. 18A and FIG. 18B are views illustrating a conventional processing method for a die which is used for the molding of a generally-used V groove.
Figure 18B:
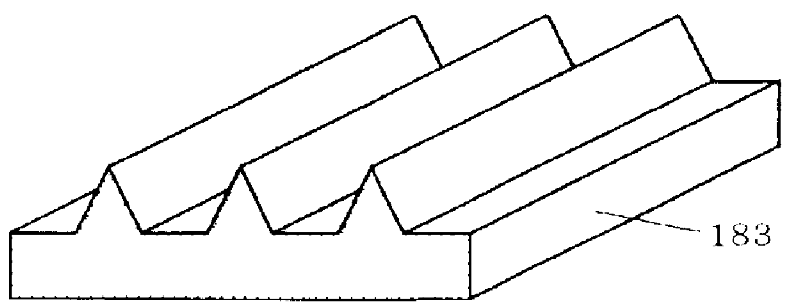

For comparison, a conventional die processing method for molding a general V groove which utilizes a microgrinder will now be described with reference to FIGS. 18A and 18B.

A circular diamond grindstone 181 having a V-shaped edge is employed as a grindstone for a microgrinder. As shown in FIG. 18A, by performing a grinding process with this grindstone 181 from an end of a plane-like ultra-hard alloy 182, a die 183 as shown in FIG. 18B can be obtained.

However, there is a limit to the planar precision which can be obtained through microgrinder processing. For example, in the case of the die for use with an optical package substrate 11 as shown in FIG. 16, the portion of the protrusion 161 corresponding to the tapered face 13 cannot be processed so as to have a sufficient reflectance. In other words, it would be highly difficult to process a complicated configuration with a microgrinder, and only dies with relatively simple configurations can be produced through microgrinder processing.

As described above, by utilizing microdischarge machining for the processing of a tool electrode, it becomes possible to produce highly precise tool electrodes of various configurations, which in turn allows for the production of dies having complicated configurations. Therefore, through press formation using such dies, optical package substrates can be produced in large quantities and at a low cost. Thus, it becomes possible to mount an optical fiber, optical waveguide, a light receiving/emitting element, or the like on an optical package substrate without the need for adjustment, and as a result, optical devices (or optical transmission/reception modules) incorporating such elements can also be produced in large quantities and at a low cost.

Although an ultra-hard alloy is exemplified as a die material in the above description, any electrically conductive material having a sufficient heat resistance and mechanical strength can be used, e.g., SUS. Alternatively, an ultra-hard alloy or the like may be used as a parent material for a die, an electrically conductive film such as a precious metal alloy film maybe formed on the surface thereof, and this film may be processed into a desired configuration.

While the present invention has been described in detail, the foregoing description is in all aspects illustrative and not restrictive. It is to be understood that numerous other modifications and variations can be devised without departing from the scope of the present invention.

What is claimed is:

1. An optical package substrate for mounting at least one of an optical component and an optical element thereon, said optical package substrate comprising:

a stage portion having a light receiving/emitting element mounted thereon, said stage portion being operable to fix an optical axis of said light receiving/emitting element, and said stage portion being formed on a surface of said substrate; and an optical path deflection section operable to deflect an optical path by reflection, said optical path deflection section being formed on the surface of said substrate so as to be in a position intersecting the optical axis of said light receiving/emitting element mounted on said stage portion.

2. The optical package substrate according to claim 1, wherein a thin film element having a mirror property is provided on said optical path deflection section.

3. The optical package substrate according to claim 1, wherein a diffraction grating operable to create different optical paths for different optical wavelengths is provided on said optical path deflection section.

4. The optical package substrate according to claim 1, wherein said optical path deflection section has a curvature for converging a plurality of incident rays through reflection.

5. The optical package substrate according to claim 1, wherein said optical package substrate comprises glass.

6. The optical package substrate according to claim 1, wherein said optical package substrate is molded by pressing a die against a substrate material which is softened by being heated to a high temperature to transcribe an inverted pattern of the die onto the substrate material, the die being obtained through microdischarge machining using a normal-grinding tool and an arbitrary fine-grinding tool, which is produced through microdischarge machining.

7. The optical package substrate according to claim 5, wherein said optical package substrate is molded by pressing a die against a substrate material which is softened by being heated to a high temperature to transcribe an inverted pattern of the die onto the substrate material, the die being obtained through microdischarge machining using a normal-grinding tool and an arbitrary fine-grinding tool, which is produced through microdischarge machining.

8. The optical package substrate according to claim 1, further comprising a waveguide section formed on the surface of said substrate, said waveguide section corresponding to an optical waveguide core pattern having an optical axis coinciding with an optical axis of said light receiving/emitting element mounted on said stage portion.

9. The optical package substrate according to claim 8, wherein a thin film element having a mirror property is provided on said optical path deflection section.

10. The optical package substrate according to claim 8, wherein a diffraction grating operable to create different optical paths for different optical wavelengths is provided on said optical path deflection section.

11. The optical package substrate according to claim 8, wherein said optical path deflection section has a curvature for converging a plurality of incident rays through reflection.

12. The optical package substrate according to claim 8, wherein said optical package substrate comprises glass.

13. The optical package substrate according to claim 8, wherein the optical package substrate is molded by pressing a die against a substrate material which is softened by being heated to a high temperature to transcribe an inverted pattern of the die onto the substrate material, the die being obtained through microdischarge machining using a normal-grinding tool and an arbitrary fine-grinding tool, which is produced through microdischarge machining.

14. The optical package substrate according to claim 12, wherein the optical package substrate is molded by pressing a die against a substrate material which is softened by being heated to a high temperature to transcribe an inverted pattern of the die onto the substrate material, the die being obtained through microdischarge machining using a normal-grinding tool and an arbitrary fine-grinding tool, which is produced through microdischarge machining.

15. An optical device having at least one of an optical component and an optical element mounted on an optical package substrate, wherein said optical package substrate comprises:

a stage portion having a light receiving/emitting element mounted thereon, said stage portion being operable to fix an optical axis of said light receiving/emitting element, and said stage portion being formed on a surface of said substrate; and an optical path deflection section operable to deflect an optical path by reflection, said optical path deflection section being formed on the surface of said substrate so as to be in a position intersecting the optical axis of said light receiving/emitting element mounted on said stage portion wherein said light receiving/emitting element is affixed to said stage portion on said optical package substrate.

16. The optical device according to claim 15, further comprising a surface mounting type light receiving/emitting element which is optically coupled to said light receiving/emitting element affixed to said stage portion through the optical path deflected by said optical path deflection section.

17. The optical device according to claim 15, wherein said optical package substrate further comprises a waveguide section formed on the surface of said substrate, said waveguide section corresponding to an optical waveguide core pattern having an optical axis coinciding with an optical axis of said light receiving/emitting element mounted on said stage portion; and wherein said optical device further comprises a predetermined substrate, wherein a core material having a refractive index which is higher than a refractive index of said optical package substrate is filled in said waveguide section of said optical package substrate, and thereafter, an adhesive having a refractive index which is lower than the refractive index of the core material is used to attach said predetermined substrate to said waveguide section.

18. The optical device according to claim 17, further comprising a surface mounting type light receiving/emitting element which is optically coupled to said optical waveguide defined in said waveguide section through the optical path deflected by said optical path deflection section.

* * * * *